Nov. 28, 1961
V. B. BENEDICT
3,010,413
PARTICULATE MATERIAL CONTAINER AND DISPENSER
ATTACHMENT FOR A ROLLING PIN
Filed Sept. 14, 1960
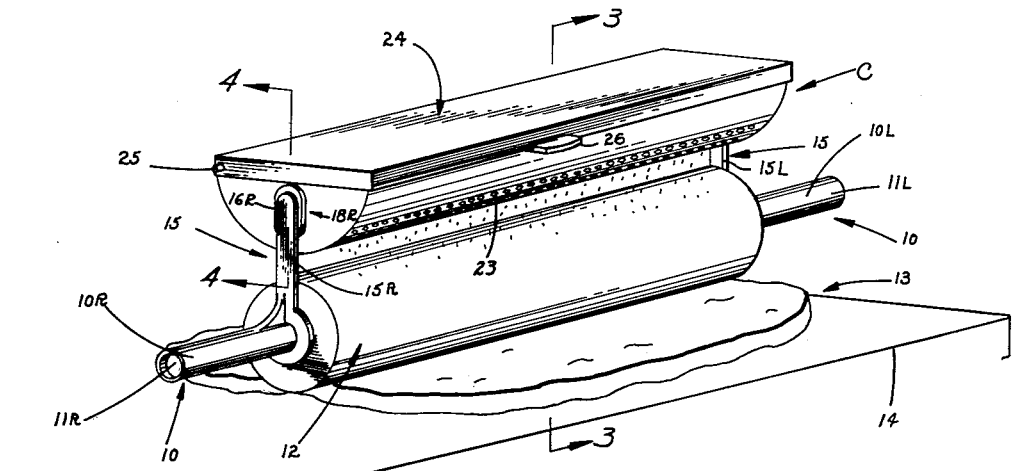
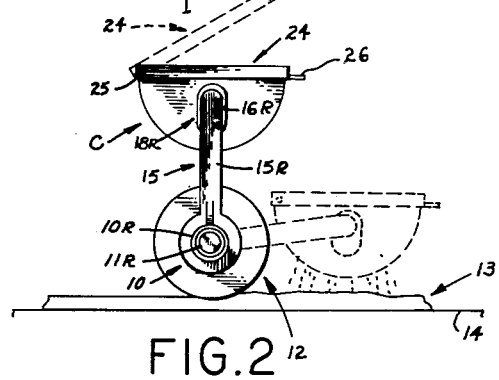
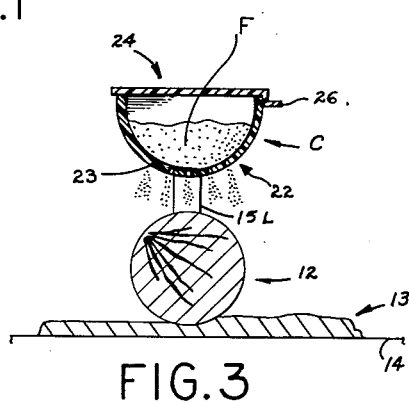
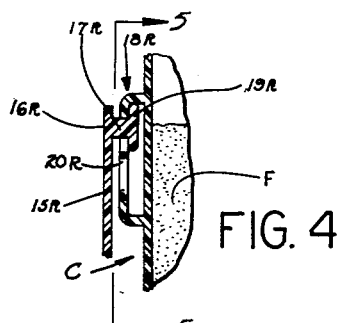
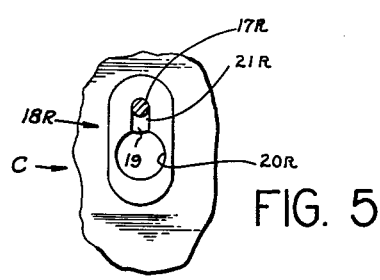
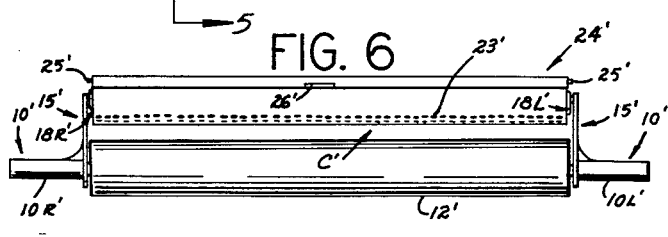
*INVENTOR.*
VERA B. BENEDICT

United States Patent Office 3,010,413
Patented Nov. 28, 1961

3,010,413
PARTICULATE MATERIAL CONTAINER AND DISPENSER ATTACHMENT FOR A ROLLING PIN
Vera B. Benedict, South Gate, Calif.
(1421 Western Ave., Topeka, Kans.)
Filed Sept. 14, 1960, Ser. No. 55,991
4 Claims. (Cl. 107—50)

The present invention consists of a particulate material container and dispenser attachment for a rolling pin, which, in one preferred form may comprise a floor sifter attachment, including handle means adapted to longitudinally spacedly receive the longitudinally aligned and spaced rotatable handles at opposite ends of a conventional rolling pin, with each of the hollow handle means being provided with outwardly directed support means adapted to extend outwardly from the longitudinal axis of the rolling pin and adapted to there be provided with a flour dispensing and/or sifting container adapted to controllably dispense flour in any selected position with respect to a rolling pin rotatably mounted by the handle means—that is, the flour may be dispensed in front of the rolling pin for use in making dough or increasing or drying out, by the addition of flour, a previously made quantity of dough which normally lies on a horizontal surface in front of the rolling pin, or the dispenser may be controllably operated so as to dispense flour directly onto the rolling pin itself for rendering the exterior thereof substantially non-adhesive as far as dough is concerned. This latter operation is for the purpose of preventing the rolling pin from sticking to a quantity of dough which is to be rolled out into flattened form through the use of the rolling pin.

It should be noted that, in one preferred form of the invention, the flour container, dispenser, and/or sifter may be pivotally connected by pivotal connection means with respect to the support means for rotation about a horizontal axis passing symmetrically longitudinally through the container and dispenser above the center of gravity thereof when it carries a quantity of flour therein which is controllably dispensed by a user of the device, thus providing an arrangement where the flour container and dispenser will always, through pivotal adjustment, maintain itself in the proper vertical orientation for the proper dispensing of flour. In one preferred form, the pivotal mounting may be accomplished by means of pivot pin means controllably disengageable and effectively pivotally interconnecting the pivotal connection means of the container and dispenser and mounting end portions of the support means for rotation about said horizontal axis.

Also, in one preferred form, the container and dispenser may have a longitudinal transversely downwardly curved dispensing bottom portion effectively comprising a multi-apertured screen adapted to sift and pass flour therethrough in response to relative movement thereof.

Also, in one preferred form, the container and dispenser may be provided with controllably openable and closable cover means.

Also, in one preferred form, the handle means may be of hollow configuration and may be integral with said support means.

In one preferred form, the flour container and dispenser may be of integrally formed material and construction (such as plastic, or the like) and may be substantially of semi-cylindrical shape.

It should be noted that the attachment of the present invention is adapted for cooperation with any of several different sizes of rolling pins by merely employing the hollow handle means and support means for use with any different-sized rolling pin and by interchanging the container and dispenser so as to mount one of an appropriate length corresponding to the length of the rolling pin. In other words, the apparatus of the present invention may be obtained in any of two or three different lengths of flour dispenser and container, any one of which is removably pivotally cooperable with the hollow handle means and support means. It is also contemplated that in certain forms of the invention the flour container and dispenser may be controllably extensible and retractable for use with rolling pins of different lengths.

Incidentally, while the present invention refers to the container and dispenser as being employed for containing and dispensing flour, it should be noted that actually any particulate material may be similarly dispensed, and the use of the word "flour" in the present invention is intended to be broadly construed, since other such particulate materials would be substantial equivalents.

It is an object of the present invention to provide a novel particulate material containing and dispensing attachment for a rolling pin of the character referred to above which is of extremely simple, cheap, fool-proof construction such as to be conducive to widespread use thereof.

Further objects are implicit in the detailed description of two exemplary embodiments of the present invention which follows hereinafter and will be apparent to persons skilled in the art after a careful study thereof.

For the purpose of clarifying the nature of the present invention, one exemplary embodiment is illustrated in the hereinbelow-described FIGS. 1 through 5 and a slight variant of the dispenser and container only, cooperating with the same handle means and supporting means, is illustrated in FIG. 6—the structures shown in all of said figures being described in detail hereinafter.

FIG. 1 is a reduced-size oblique view of one exemplary embodiment of the invention shown in rolling-out and flattening relationship, with respect to a quantity of dough carried on a horizontal supporting surface, and showing the flour container and dispenser of the present invention in the act of dispensing a small quantity of flour directly onto the rolling pin so as to prevent it from sticking to the underlying dough.

FIG. 2 shows in solid lines a left-end elevation of FIG. 1. This view shows in broken lines the partially open position of the cover means normally closing the flour container and dispenser. This view also shows in broken lines an alternate forward position of the flour container and dispenser wherein it dispenses flour directly onto the portion of the dough lying in front of the rolling pin. This is normally for the purpose of increasing the quantity of dough and/or of drying it out by increasing the quantity of flour with relation to the quantity of liquid.

FIG. 3 is a sectional view taken in the direction of the arrows 3—3 of FIG. 1. It should be noted that in this view the rolling pin is shown as being of solid construction. However, this is for drawing illustration purposes only, and is not to be construed in a limiting sense since the flour sifter attachment herein disclosed is just as adaptable to rolling pins of the well known hollow constructions.

FIG. 4 is a fragmentary sectional view of the left one of the two similar pivotal connection means and pivot pin means mounting the flour container and dispenser with respect to the support means carried by the opposed handles whereby to maintain the container and dispenser in vertical orientation at all times. This view is taken in the direction of the arrows 4—4 of FIG. 1.

FIG. 5 is a fragmentary view taken in the direction of the arrows 5—5 of FIG. 4 and further illustrates the controllably disengageable nature of the pivotal connection means and pivot pin means.

FIG. 6 is an elevational view of a slightly modified form of the invention wherein the container and dispenser is somewhat longer than in the first form of the invention illustrated in FIGS. 1–5.

Referring to FIGS. 1–5 for exemplary purposes, one illustrative embodiment of the invention takes a typical exemplary form wherein it comprises a pair of handle members, indicated generally at 10, and, in the form shown, comprising a hollow substantially tubular left handle member 10L and a similar hollow substantially tubular right handle member 10R, each of which has a hollow interior portion which is adapted to receive therein a corresponding one of the longitudinally aligned and spaced rotatable handles 11L and 11R carried at opposite ends of the rolling pin indicated generally at 12. This provides an arrangement whereby the rolling pin 12 is effectively rotatably mounted with respect to the hollow attachment handle means 10 for rotation about a horizontal longitudinal axis at the center line of the aligned rolling pin handles 11L and 11R. In other words, the rolling pin is still capable of being rolled along in a flattening manner with respect to a quantity of dough, such as is indicated generally at 13, which lies upon a horizontal surface 14 in a manner similar to the normal operation of the rolling pin without the attachment of the present invention.

In the specific example illustrated in FIGS. 1–5, each member of the pair of hollow or tubular handle members 10 is provided with outwardly or radially directed support means, indicated generally at 15, adapted to carry at their outer ends the container and dispenser indicated generally at C.

In the specific form illustrated in FIGS. 1–5, the support means 15 comprises two transverse arms 15L and 15R integral with the corresponding hollow attachment handles 10L and 10R, respectively, and each being provided with an outer mounting end portion, such as the mounting end portion 16R of the right mounting arm 15R shown in FIG. 4—it being understood that the left mounting end portion carried by the left support arm 15L is substantially identical, although positionally reversed. Each mounting end portion, such as the right hand one shown at 16R, is then provided with pivot pin means, such as the right one shown at 17R in FIG. 4—it being understood that the left one is identical although positionally reversed. Each of the pivot pin means, such as the right one shown at 17R in FIG. 4, is releasably pivotally interconnected with the pivotal means carried by the container dispenser; such as the right one indicated at 18R in FIG. 4—it being understood that the left pivotal connection means is similar to the right one but positionally reversed. Since both pivot pin means and pivotal connection means are identical, only the right ones shown at 17R and 18R will now be described in detail—it being understood that the left ones are substantially identical. The right pivot pin means 17R has an enlarged retaining head 19R which is adapted to be inserted through a slightly larger circular hole 20R of the pivotal connection means 18R and is then adapted to be retained behind the upper portion of the pivotal connection means 18R after the pivot pin 17R has been slidably moved upwardly along a slot 21R into the retained position shown in both FIGS. 4 and 5.

It will be noted that the longitudinal center line through each of the pivot pins, such as the right one shown at 17R, will comprise the axis of revolution of the entire container and dispenser C and that this axis of revolution extends longitudinally through the container and dispenser C above the center of gravity thereof. This is particularly true when the container and dispenser carries a quantity of flour, such as that shown at F therein and which is to be controllably dispensed by a user of the device through the multi-apertured screen, indicated generally at 22. Because of the fact that the axis of revolution of the container and dispenser C is positioned above the center of gravity thereof, the container and dispenser C will always remain in vertically oriented upright position irrespective of whether it is positioned above the rolling pin 12 as shown in solid lines in FIGS. 1, 2, and 3 or is positioned in front of the rolling pin as shown in broken lines in FIG. 2.

It should be noted that the container and dispenser C can be very easily disengaged from the handles 10 by merely lifting it up until each of the enlarged holes, such as the right one shown at 20R in FIGS. 4 and 5 is aligned with the corresponding enlarged retaining head, such as the right one shown at 19R in FIGS. 4 and 5, after which the corresponding handle 10R may be slidably removed from the rolling pin handle 11R, which will cause the enlarged retaining head 19R to move outwardly through the enlarged hole 20R. This can also be done at the left end of the apparatus, and the container and dispenser C will be completely disengaged from the handles 10. This may be for the purpose of using the rolling pin 12 in a conventional manner without the attachment of the present invention; it may be for the purpose of allowing cleaning and/or storage of the various elements; or may be for re-engaging each of the pivot pins with respect to corresponding pivotal connection means at opposite ends of a substantially longer container and dispenser such as that shown at C′ in FIG. 6 whereby to allow the apparatus to be used with a substantially longer rolling pin, such as that shown at 12′ in FIG. 6.

In the specific example illustrated, the container and dispenser C has a longitudinal transversely downwardly curved dispensing bottom portion which effectively comprises a multi-apertured screen, indicated at 22 having a plurality of holes or apertures 23 therethrough of a size such that relative motion or agitation of the container and dispenser C with respect to the flour F contained therein will cause a selected quantity thereof to be dispensed and sifted through the apertures 23, either directly onto the rolling pin 12 in the manner shown in solid lines in FIGS. 1 and 3, or to be sifted directly onto a quantity of dough, such as that shown at 13 in FIG. 2 positioned in front of the rolling pin 12. This is illustrated in dotted lines in FIG. 2.

It should also be noted that the apparatus might be so positioned as to sift flour onto the dough behind the rolling pin, if desired. It will be noted that the position of the container and dispenser C is determined by the orientation of the hollow handles 10 in the hands of a user of the device and that this orientation can be easily changed at the will of a user of the device.

The container and dispenser may, if desired, be provided with controllably openable and closable cover means, such as that indicated generally at 24. This may comprise any type of cover but, in the example illustrated, it comprises a substantially rectangular cover hinged by pivot pin means 25 at each end thereof to one side of the semi-cylindrical container and dispenser C and being provided with digitally engageable opening handle means 26 at the opposite edge thereof, and being of a nature such as to resiliently frictionally maintain itself in closed position by reason of frictional resilient engagement of the opposed parts of the opening and closing edges of the container and dispenser C and cover means 24. However, cover means 24 may be modified substantially, positionally reversed, or, in certain forms of the invention, eliminated entirely.

It should also be noted that the handle means 10 may be provided with outer end closures, if desired.

The means for effectively pivotally interconnecting the support means 15 and the container and dispenser C may be modified substantially from the specific exemplary form shown in the drawings and described in detailed herein as long as the structure is within the basic spirit, scope, and/or teachings of the present invention.

Each of the handle means and support means may be integrally formed of suitable plastic or metal material as may the container and dispenser means, exclusive of the cover means.

FIG. 6 illustrates handle means 10' and support means 15' pivotally interconnected in an identical fashion to the disclosure of the first form of the invention illustrated in FIGS. 1–5 with respect to opposite ends of a container and dispenser C' identical to that illustrated in the first form of the invention except that it is longer so as to be suitable for use with the longer rolling pin 12'. Since this form of the invention is identical except for the greater length of the container and dispenser C', all corresponding parts are indicated by similar reference numerals, primed, and no further or more specific description is thought necessary. It is self-evident that various lengths of container and dispenser may be provided for cooperation with the handle means and support means so as to be suitable for use with any size of rolling pin.

It should also be noted that the present invention contemplates the provision of an extensible and retractable container and dispenser which may be used with rolling pins of various lengths.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A flour sifter attachment for a cylindrical rolling pin of the type having an axially extending handle at each end, said sifter comprising, a pair of spaced tubular handles adapted for telescoping relation with said first mentioned handles, each of said tubular handles being provided with a support arm, radially directed therefrom and terminating in a free end portion at a point spaced outwardly of the rolling pin periphery, an elongated container dispenser, substantially equal in length to said rolling pin and provided with a plurality of apertures arranged along a lengthwise portion thereof, axially aligned, releasable interconnecting pivot means mounted between each end of said container above its apertured portion and its center of gravity axis and the said free ends of said support arms, for permitting said container to swing about a horizontal axis either forward of, or over, or behind said rolling pin when said flour sifter attachment is installed thereon.

2. The flour sifter attachment as defined in claim 1 wherein said releasable interconnecting means comprises the combination of a pivot pin having an enlarged head and a pivot pin receiving recess having a button-hole shaped pin receiving opening.

3. The flour sifter attachment as defined in claim 1 wherein said container dispenser is provided with an operable and closable cover for its uppermost portion and a downwardly facing semi-cylindrical configuration in its apertured portion.

4. The flour sifter attachment as defined in claim 1 wherein said support arms, with their releasable pivot means and the said tubular handles are of an integral molded plastic construction, and the container portion of said dispenser and its releasable pivot means are likewise of an integral molded plastic construction.

References Cited in the file of this patent

UNITED STATES PATENTS

| 807,075 | Harloe | Dec. 12, 1905 |
| 855,042 | Cattlin | May 28, 1907 |
| 1,856,585 | Parsons | May 3, 1932 |

FOREIGN PATENTS

| 136,655 | Austria | Feb. 26, 1934 |